United States Patent [19]
Bailey

[11] 3,725,644
[45] Apr. 3, 1973

[54] INPUT SWITCH FOR REVERSING THE SENSE OF AN AMPLIFIER IN A SINGLE LOOP HEATING-COOKING SYSTEM

[75] Inventor: Ronald L. Bailey, Rockford, Ill.

[73] Assignee: Barber-Colman Company, Rockford, Ill.

[22] Filed: Apr. 11, 1972

[21] Appl. No.: 243,043

[52] U.S. Cl. ............... 219/494, 73/362 AR, 236/1 C, 307/117, 323/19, 323/75 N, 219/499
[51] Int. Cl. ............................................. G05d 23/00
[58] Field of Search ........ 323/19, 75 H, 75 N, 94, 96; 219/483, 490, 494, 499; 330/146, 147; 165/33; 73/362 AR; 236/1 C, 91; 307/117, 118

[56] References Cited

UNITED STATES PATENTS

| | | | |
|---|---|---|---|
| 3,377,545 | 4/1968 | Tveit | 323/19 |
| 3,543,583 | 12/1970 | Holsten | 73/362 AR |
| 3,678,247 | 7/1972 | Sawa et al. | 219/499 |

*Primary Examiner*—Gerald Goldberg
*Attorney*—A. Richard Koch

[57] ABSTRACT

A single-pole, double-throw switch and a pair of input resistors connected in series between the alternative terminals of said switch may be employed between a pair of condition sensitive terminals and a pair of input terminals for an amplifier to reverse the sense of the amplifier output.

12 Claims, 8 Drawing Figures

PATENTED APR 3 1973  3,725,644

INPUT SWITCH FOR REVERSING THE SENSE OF AN AMPLIFIER IN A SINGLE LOOP HEATING-COOKING SYSTEM

BACKGROUND OF THE INVENTION

In a single loop heating and cooling system, either hot or chilled fluid is circulated in the loop to various zones of the space to be conditioned. When hot fluid is being circulated, only heating may be provided to the space, and, when chilled fluid is being circulated, only cooling may be provided. The heating and cooling requirements of the various zones will be different due to the position of the sun, direction of the wind, amount of outside wall, windows, occupancy of the space, etc. Valves are controlled by thermostats to provide only the amount of heating or cooling required by their respective zones. During the heating season the valves must be opened as the temperature falls and closed as the temperature rises, while during the cooling season the valves must be opened as the temperature rises and closed as the temperature falls. This necessitates reversal of valve operation as the seasons change between heating and cooling, or more specifically when the fluid circulated is changed between hot and chilled.

In the past double-pole, double-throw switches, manually or automatically operated, were employed to reverse connections to either the thermostats or the valve actuators. Such switches were relatively expensive and unreliable. Tveit in U.S. Pat. No. 3,377,545, issued Apr. 9, 1968, disclosed the use of a single-pole, double-throw switch to select alternative outputs of a differential amplifier. It required an amplifier with alternative opposite outputs.

SUMMARY OF THE INVENTION

This invention permits reversal of the sense of the output of a single output amplifier by means of a single-pole, double-throw switch. No change is required in the amplifier feedback circuit to maintain gain constant when the sense of the amplifier output is reversed. There is no offset as the output is reversed. The amplifier may be made to produce a proportional or a two level output. An amplifier output is automatically reversed in sense in response to a condition. A summer-winter thermostatic control for a single loop heating-cooling system is provided.

DESCRIPTION OF THE PREFERRED EMBODIMENTS

Figure 1:
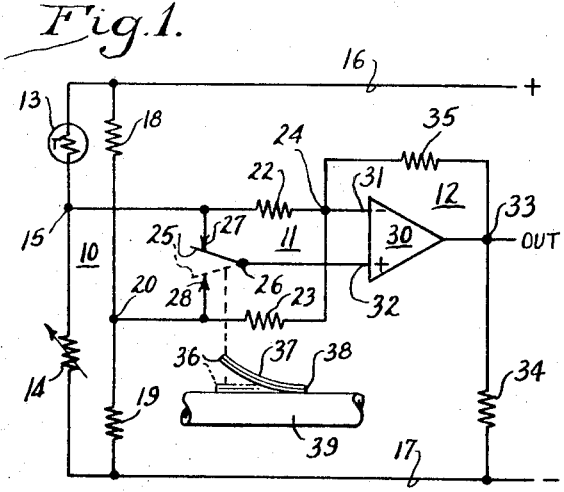
FIG. 1 is a schematic circuit of a preferred embodiment of the invention used in an automatic summer-winter changeover thermostat.

The summer-winter thermostat shown in FIG. 1 comprises a temperature sensitive impedance bridge 10, a reversing circuit 11 and an output controller 12. A temperature sensitive resistor 13 and a variable set point resistor 14 are joined at a condition sensitive signal terminal 15 and form a series circuit between positive (+) and negative (−) supply lines 16, 17. A pair of resistors 18, 19 are joined at a reference signal terminal 20 and form another series circuit between supply lines 16, 17. The resistors 13, 14, 18, 19 are the arms, and signal terminals 15, 20 are the output terminals of bridge 10 powered by supply lines 16, 17. A pair of input resistors 22, 23 are joined at summing junction 24 and form a series circuit coupled between signal terminals 15, 20. A single-pole, double-throw switch 25 in its solid line position connects a common terminal 26 to an alternative terminal 27, coupled to signal terminal 15, and in its dashed line position connects the common terminal to the other alternative terminal 28, coupled to signal terminal 20. The input resistors 22, 23 with the switching device 25 comprise the reversing circuit 11. An operational amplifier 30, receiving power from supply lines 16, 17, has its inverting terminal 31 coupled to summing junction 24, its non-inverting terminal 32 coupled to the common terminal 26, and its output terminal 33 connected through a load such as resistor 34 to supply line 17 and through a negative feedback resistor 35 to inverting input terminal 31. The amplifier 30 with its feedback circuit, here shown as resistor 35, comprise the output controller 12. Means for selectively changing connections of switch 25 is provided by the free end 36 of a temperature responsive operator, such as a bimetal strip 37 affixed at another end 38 to a hot or chilled fluid delivering conduit 39.

Figure 1A:
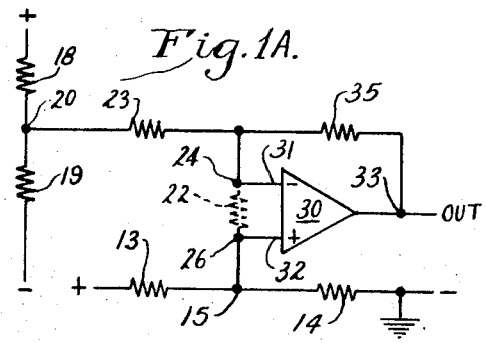
FIGS. 1A and 1B show the circuit of FIG. 1 redrawn to emphasize certain characteristics in alternative conditions.
Figure 1B:
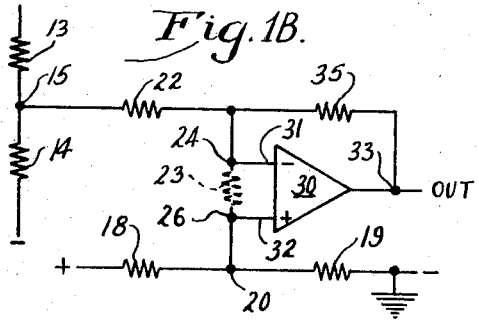

The circuit of FIG. 1 with the switch 25 is solid line position has been redrawn as FIG. 1A to show that it is conventional differential input amplifier. The input resistor 22 has been shown in dashed lines to indicate that it has no effect on the circuit. Since the input terminals 31, 32 are maintained at the same voltage, the resistor 22 is effectively short circuited. The operation of a differential input amplifier is well known and therefore will not be described. The circuit of FIG. 1 with the switch 25 in dashed line position has been redrawn as FIG. 1B to show that it too is conventional differential input amplifier. The input resistor 23 is shown in dashed lines to indicate that it has no effect, being effectively short circuited. The circuits in FIG. 1A and 1B are of identical configuration, but the positions of specific components have been transposed. If the input resistors 22, 23 are substantially equal, the gain of the amplifier 30 will remain substantially constant when switch 25 is thrown from one alternative position to the other.

In operation supply lines 16, 17 are connected to the positive (+) and negative (−) poles of a direct current source. The temperature sensitive resistor 13 is located to sense the temperature in a controlled space, its resistance increasing and decreasing as the sensed temperature rises and falls, so that the condition sensitive voltage at signal terminal 15 decreases and increases. The reference voltage at signal terminal 20 is maintained substantially constant by resistors 18, 19, which are usually equal in value, but may be adjusted to establish any desired signal voltage at terminal 20. The resistances of resistors 13, 14 are chosen so that, when the sensed temperature is at the set point, as determined by the variable resistor 14, the voltages at signal terminals 15, 20 are equal. When the voltages at signal terminals 15, 20 are equal, the voltage at summing junction 24 will be the same, so that equal voltages will be applied to the inverting and non-inverting input terminals 31, 32 regardless of the position of switch 25. Under this condition there will be no change in output voltage at output terminal 33 from a bias voltage equal to the voltage at the non-inverting input terminal 32. When the space temperature sensed by the temperature sensitive resistor 13 is above the set point temperature, the condition sensitive voltage at signal terminal 15 will be less than the reference voltage at signal terminal 20. The voltage at summing junction 24 will then be higher than at signal terminal 15 and lower than at signal terminal 20. When the sensed space temperature is below the set point, the voltage at summing junction 24 will be lower than at signal terminal 15 and higher than at signal junction 20.

The conduit 39 selectively delivers hot and chilled fluid to the controlled space. The bimetal 37 is deflected upwardly to its solid line position when hot fluid is present in the conduit and to the dashed line position when chilled fluid is present. In its solid line position, the free end 36 moves switch 25 to its solid line position, connecting the common terminal 26 to alternative terminal 27 and signal terminal 15. In the dashed line position of bimetal 37, the free end 36 moves switch 25 to its dashed line position, connecting the common terminal 26 at alternative terminal 28 and signal terminal 20.

The inverting input terminal 31 is connected to the summing junction 24, so that the voltage at the summing junction is inverted by the differential amplifier 30. The non-inverting input terminal 32 is connected to common terminal 26, so that the voltage appearing at the selected one of signal terminals 15, 20 is applied to this non-inverting input terminal. The output voltage produced at output terminal 33 is then equal to the bias voltage minus the amplified algebraic difference between the voltage applied to the inverting and non-inverting terminals 31, 32. It will be seen that when hot fluid is being supplied by conduit 39, if the sensed space temperature is above set point the voltage applied to the inverting input terminal 31 from summing junction 24 will be higher than the voltage applied to the non-inverting input terminal 32, from signal terminal 15, and the change in output voltage at output terminal 33 will be negative with respect to the bias voltage and proportional in amplitude to the difference between the sensed space temperature and the set point. If the sensed space temperature were below the set point, the voltage applied to the inverting terminal 31 would be lower than the voltage applied to the non-inverting terminal 32 and the change in output voltage at output terminal 33 would be positive with respect to the bias voltage and proportional in amplitude to the difference between the sensed space temperature and the set point. When chilled fluid is being delivered by conduit 39, if the sensed space temperature is above set point the voltage applied to inverting input terminal 31 will be lower than the voltage at the non-inverting terminal 32 and the voltage change at output terminal 33 will be positive with respect to the bias voltage and proportional in amplitude to the difference between the sensed space temperature and the set point. If the sensed space temperature were below the set point, the voltage applied to the inverting terminal 31 would be higher than the voltage at non-inverting terminal 32 and the change in voltage at output terminal 33 would be negative with respect to the bias voltage and proportional to the difference between the sensed space temperature and the set point. The change in output voltage is always proportional to the difference between sensed space temperature and the set point, but the polarity with respect to the bias voltage is reversed as the fluid in the conduit is changed between hot and chilled. This polarity change with respect to the bias voltage is illustrated in the following chart:

|  | Hot Fluid | Chilled Fluid |
| --- | --- | --- |
| Above set point | − | + |
| Below set point | + | − |

When the change is positive (+) the fluid in conduit 39 is usable to correct the sensed space temperature condition and when the output is negative (−) it is not. The positive (+) change can therefore be employed to open a valve permitting fluid to flow into the controlled space to correct the temperature error, while a negative (−) output results in closure of the valve.

Figure 3:
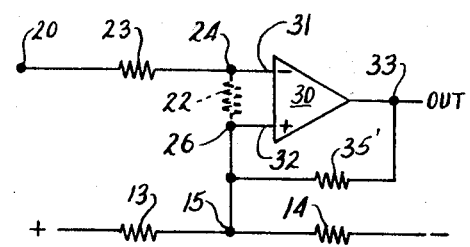
FIG. 3 is a modification of FIG. 1A, demonstrating that positive feedback may be employed.

While a negative feedback resistor 35 has been shown, producing an amplitude proportioned output voltage, it could be eliminated to produce a two level output voltage, or a positive feedback could be provided between output terminal 33 and the non-inverting input terminal 32, as shown in FIG. 3, to produce a more stable two level output voltage. Although a Wheatstone bridge has been shown, other signal sources could be used. For example a ramp generator of well known type could be substituted for the resistors 18, 19, providing in a two level controller a time proportioned two level output voltage. The components of the bridge could be rearranged in well known manner. Switch 25 could be positioned manually instead of automatically. It will be obvious that if alternating current rather than direct current were supplied, the phase of the output voltage could be reversed by switch 25. The circuit could be adapted to control humidity, liquid level and other conditions. The output may be employed directly or as the input to an additional amplifier or a controlled switching device.

Figure 2:
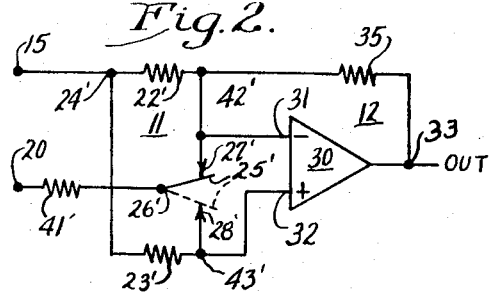
FIG. 2 is a fragment of the circuit shown in FIG. 1 modified to show another arrangement of components.

FIG. 2 shows a variation of FIG. 1 in which the connections to the reversing circuit 11 are reversed, while providing substantially the same result. The same reference numerals are employed for identical components, but with the addition of primes (') to the components of the reversing circuit to call attention to the different connections.

The junction 24' is connected to signal terminal 15, the common terminal 26' through an input resistor 41' to signal terminal 20, and alternative terminals 27', 28' to inverting and non-inverting input terminals 31, 32 respectively. With the switch 25' in solid line position, the signal voltages at signal terminals 15, 20 are summed at summing junction 42' to provide the voltage to inverting input terminal 31, while the voltage at signal terminal 15 is applied through input resistor 23' to non-inverting terminal 32. If the signal voltage at terminal 15 is higher than at terminal 20, the inverting input terminal 31 will be at a lower voltage than the non-inverting input terminal 32, and the voltage at output terminal 33 will be higher than the bias voltage. If the signal voltage at terminal 15 is lower than at terminal 20, the output voltage will be lower than the bias voltage. With the switch 25' in dashed line position, the signal voltage at terminal 15 is applied through input resistor 22' to inverting input terminal 31, while the signal voltages at terminals 15, 20 are summed at summing junction 43' to provide the voltage at non-inverting terminal 32. If the voltage at terminal 15 is higher than at terminal 20, the inverting terminal 31 will be at a higher voltage than non-inverting terminal 32, and the voltage at output terminal 33 will be lower than the bias voltage. If the voltage at signal terminal 15 is lower than at terminal 20, the inverting terminal 31 will be at a lower voltage than non-inverting terminal 32, and the voltage at output terminal 33 will be higher than the bias voltage. Once again it will be seen that the change in output voltage is reversed in polarity with respect to the bias voltage when the switch 25' is moved between solid and dashed line positions.

Figure 2A:
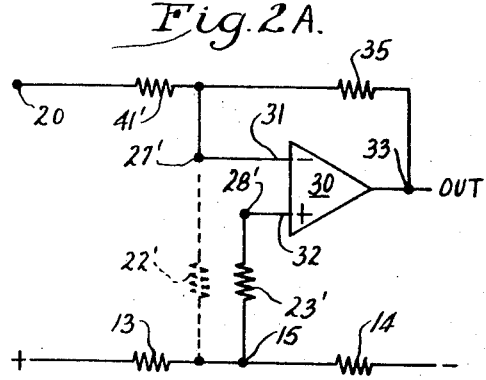
FIGS. 2A and 2B show the fragmentary circuit of FIG. 2 redrawn to emphasize certain characteristics in alternative conditions.
Figure 2B:
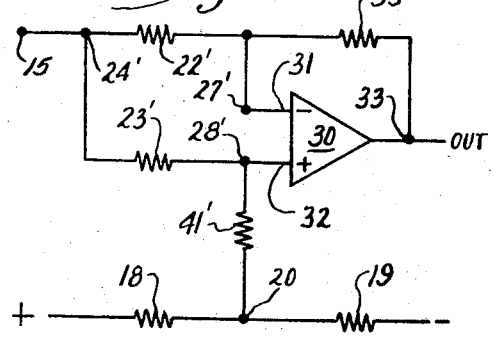

The circuit of FIG. 2 with the switch 25' in solid line position has been redrawn as FIG. 2A to show that it too is a conventional differential input amplifier. The input resistor 22' has been shown in dashed lines to indicate that it has no effect upon the circuit. Since the non-inverting input terminal 32 draws no current, the input resistor 23' merely stabilizes drift and there is no voltage drop between signal terminal 15 and non-inverting input terminal 32. The input terminals 31, 32 are maintained at the same voltage, so there is no voltage drop across input resistor 22' connected between terminals 15 and 31. The circuit of FIG. 2 with switch 25' in dashed line position has been redrawn as FIG. 2B to show that it is also a differential input amplifier. With equal input resistors 22', 23', 41' the gain is lower than in FIG. 2A due to the voltage divider between signal terminals 15, 20 supplying the non-inverting input terminal 32. However, if input resistor 22' is substantially half the resistance of each of the other input resistors 23', 41', the gains in FIGS. 2A, 2B are the same. In general the resistances of input resistor 41' and feedback resistor 35 are chosen to provide the desired gain in FIG. 2A and the resistance of input resistor 22' is then selected to substantially equal to the product divided by the sum of the resistances of resistors 23', 41'.

FIG. 3 shows a variation of FIG. 1A, in which a positive feedback resistor 35', coupled between the output and non-inverting input terminals 33, 32, has been substituted for the negative feedback resistor 35. The positive feedback provides an amplified two level output instead of a modulated output. Such circuits are quite common and will not be further explained. The input resistor 22 is ineffective as explained previously. The circuit is a conventional inverting amplifier with positive feedback and a biased output. The same circuit configuration, but with some components transposed would represent the circuit with switch 25 in dashed line position, just as FIG. 2B has the same configuration as FIG. 1A.

Figure 4:
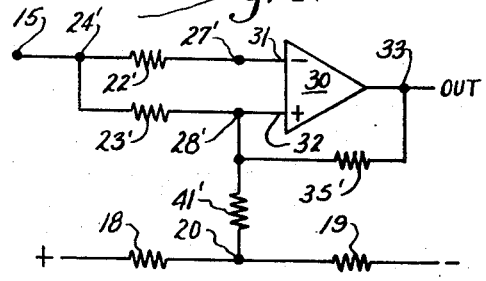
FIG. 4 is a modification of FIG. 2B, showing that positive feedback may be employed.

FIG. 4 shows a variation of FIG. 2B, in which a positive feedback resistor 35', coupled between output and non-inverting input terminals 33, 32, has been substituted for negative feedback resistor 35. This circuit is the same as FIG. 3, but with the signal voltages summed at the non-inverting terminal 32. The connection of a positive feedback instead of the negative feedback in FIG. 2A seems obvious in view of FIGS. 3, 4. The signal voltages would be summed at the inverting terminal 31.

I claim:

1. In combination, an amplifier having a pair of input terminals and an output terminal, a first input resistor, a second input resistor, one end of each of said input resistors coupled to a junction, a switching means having a common terminal selectively connected to one of a first and a second alternative terminals, said alternative terminals joined to respective other ends of said input resistors, a pair of signal terminals for coupling to respective signal sources, the other ends of said input resistors coupled to the respective terminals of one of said pairs of terminals, and the junction and said common terminal coupled to the respective terminals of the other of said pairs of terminals, whereby the sense of an output signal produced at said output terminal may be reversed by changing the connection of said common terminal from one to the other of said alternative terminals.

2. A combination according to claim 1 wherein said amplifier comprises an operational amplifier, said pair of input terminals comprising the inverting and non-inverting input terminals of said amplifier.

3. A combination according to claim 2 additionally comprising a feedback circuit between the output terminal and one of said input terminals.

4. A combination according to claim 2, wherein the pair of terminals coupled to said junction and the common terminal comprises the inverting and non-inverting input terminals, and additionally comprising a feedback resistor coupled between the output and inverting input terminals.

5. A combination according to claim 4, in which said input resistors are substantially equal, whereby the gain of said amplifier remains substantially constant as the connection of said common terminal is charged from one to the other of said alternative terminals.

6. A combination according to claim 2, wherein the inverting input terminal is coupled to said first input resistor, the non-inverting input terminal is coupled to said second input resistor, and additionally comprising a third input resistor coupled between the common terminal and one of said signal terminals, and a feedback resistor coupled between the output and inverting input terminals.

7. A combination according to claim 6, in which said first input resistor is selected to be substantially equal to the product divided by the sum of the resistances of said second and third input resistors, whereby the gain of said amplifier remains substantially constant as the connection of said common terminal is changed from one to the other of said alternative terminals.

8. A combination according to claim 1 wherein said switching means comprises a single-pole, double-throw switch.

9. A combination according to claim 1 additionally comprising operating means selectively changing the connection of said common terminal from one to the other of said alternative terminals in response to a variable sensed condition.

10. A combination according to claim 1 wherein said signal terminals comprise the output terminals of a condition sensitive impedance bridge.

11. A combination according to claim 1 wherein one of said signal terminals is connected to a source of reference voltage and the other of said signal terminals is connected to a source of condition sensitive voltage.

12. A combination according to claim 4, comprising in addition a pair of current supply lines, a temperature sensitive bridge receiving current from said supply lines and delivering a temperature responsive and a reference signal to the signal terminals, said bridge comprising a temperature sensitive resistor in a controlled space and a variable set point resistor, a conduit delivering a selected one of hot and chilled fluids to said space, an operator selectively changing the connection of said common terminal from one to the other of said alternative terminals in response to a change in the selection of said fluids.

* * * * *